Aug. 9, 1960   A. G. BODINE, JR   2,948,059
SONIC SYSTEM FOR UNSCREWING THREADED PIPE JOINTS
Filed July 12, 1957   8 Sheets-Sheet 1

FIG. I

INVENTOR.
ALBERT G. BODINE
BY
ATTORNEY

Aug. 9, 1960  A. G. BODINE, JR  2,948,059
SONIC SYSTEM FOR UNSCREWING THREADED PIPE JOINTS
Filed July 12, 1957  8 Sheets-Sheet 2

INVENTOR.
ALBERT G. BODINE
BY
ATTORNEY

Aug. 9, 1960  A. G. BODINE, JR  2,948,059
SONIC SYSTEM FOR UNSCREWING THREADED PIPE JOINTS
Filed July 12, 1957  8 Sheets-Sheet 4

FIG. 7

INVENTOR.
ALBERT G. BODINE
BY

ATTORNEY

Aug. 9, 1960    A. G. BODINE, JR    2,948,059
SONIC SYSTEM FOR UNSCREWING THREADED PIPE JOINTS
Filed July 12, 1957    8 Sheets-Sheet 5

INVENTOR.
ALBERT G. BODINE
BY
ATTORNEY

Aug. 9, 1960     A. G. BODINE, JR     2,948,059
SONIC SYSTEM FOR UNSCREWING THREADED PIPE JOINTS
Filed July 12, 1957     8 Sheets-Sheet 7

INVENTOR.
ALBERT G. BODINE
BY
ATTORNEY

United States Patent Office 2,948,059
Patented Aug. 9, 1960

2,948,059

SONIC SYSTEM FOR UNSCREWING THREADED PIPE JOINTS

Albert G. Bodine, Jr., 13120 Moorpark St., Van Nuys, Calif.

Filed July 12, 1957, Ser. No. 671,612

4 Claims. (Cl. 29—427)

This invention relates generally to methods and apparatus for facilitating the unscrewing of pipe at tightly bound or frozen screw couplings, through use of high amplitude sonic wave action in the coupling.

The invention is applicable to the unscrewing of lengths of screw-coupled pipe making up an industrial pipe line, such as a water, oil or gas pipe line. Often, after a long service period, the threaded coupling sleeves and pipe are found to be in a frozen, rusted or corroded condition. Such pipe is often relatively thin-walled, and incapable of withstanding high torque without distortion or collapse. It often becomes impossible to apply sufficient torque to the pipe to break it free from the coupling sleeve without deforming or destroying it. Various known procedures are resorted to when such situations are encountered, but none result in a clean uncoupling, without in some way altering the pipe, whether accidentally, or by design.

A primary object of the invention, therefore, is to provide a novel method of and means for unscrewing tightly stuck or frozen pipe from its coupling.

Briefly introduced at this point, the invention involves the transmission of high amplitude, or "finite amplitude," sound waves through the material of the male and female members of the frozen screw joint. Such sound wave transmission causes periodic elastic deformation waves to occur in both the male and female members of the joint. The particular wave pattern established may be any one of a number of possibilities, and as one example, I may mention a dilational mode or pattern, whereby the male and female members alternately elastically expand and contract. To avoid permanent deformation of the pipe and coupling, the amplitude of the waves used is made high, but not sufficient to exceed the elastic limit of the members. In some instances, the waves applied may be very advantageously adjusted to be within a range of frequencies in the neighborhood of the peak resonant frequencies for the male and female coupling members. Because of differences of dimensions, the peak resonant frequency of one of the members will ordinarily differ from the peak resonant frequency of the other. Hence, a wave in the general range of these differing resonant frequencies will have a greater amplitude of vibration response on the part of one of the members than on the part of the other. In an illustrative form of the invention, the frequency of the applied waves is adjusted as closely as possible to peak resonance for the outside member, with the result that on each expansion half-cycle, it will separate slightly from the inside member. Moreover, owing again to difference in resonant frequency, one member vibrates out-of-phase with the other, so that a desirable relative cyclic movement occurs between the two members, tending to work them free. The invention further contemplates applying an unscrewing torque to the coupled members. It will be seen that this may follow the wave treatment, the result of which is to free bound surfaces of the engaging threads from one another. The wave action tends to break the static friction. An important and preferred feature of the invention, however, is the application of this torque during the transmission of the sound waves through the coupling, since the members may be most easily unscrewed in the dynamic state wherein the two members are undergoing out-of-phase vibrations at differential amplitudes. A certain dynamic "looseness" thus exists during the described sound wave action, which can best be availed of by unscrewing while this loose condition prevails, i.e., while the members are undergoing their characteristic differential sound wave vibration.

The invention has a further important application in the oil industry. It rather commonly occurs, for instance, that while drilling a well bore at substantial depths, a lower portion of the pipe becomes stuck in the bore. It then becomes desirable to remove the pipe above the stuck point, and desirable also to unscrew the pipe at the first tool joint above the stuck point. An analogous situation arises in removing screw-coupled casing from an oil well. Obviously, it is normally unlikely that the first coupling joint above the stuck point will become unscrewed if the top of pipe column, containing many joints, is merely turned in an unscrewing direction at the ground surface. Usually, some joint other than the desired lowermost one proves to be the loosest of the large number in the pipe column. It has been discovered that the firing of an explosive charge inside the pipe near the region of the desired joint will cause this joint to become loosened, but this results in a permanent deformation with poorly controlled magnitude, which is very different from the action involved in the practice of the subject invention.

Fig. 7b is a section taken on a line 7b—7b of Fig. 7a;

Fig. 7c is a section taken on broken line 7c—7c of Fig. 7a;

Figure 1:
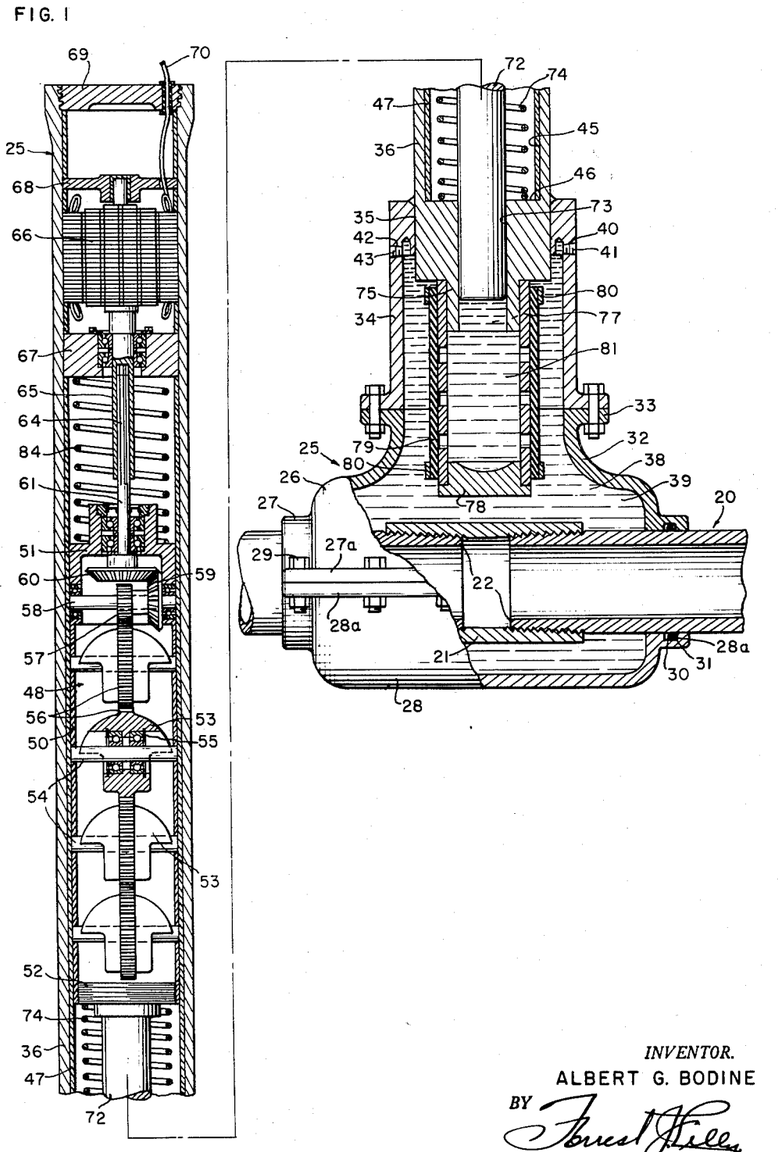
Fig. 1 is a longitudinal sectional view of a form of the invention designed to facilitate the unscrewing couplings in horizontal pipe lines.

Reference is first directed to that application of my invention directed to unscrewing of couplings in utility pipe lines, as represented in Fig. 1. Numeral 20 designates a segment of a pipe line and 21 a screw threaded coupling sleeve joining the taper threaded end portions 22 of two adjacent lengths of pipe. It is assumed that the coupling has been tightly made up, and that the resulting elastic deformation of the threaded male and female coupling members has developed sufficiently high stresses between the threads so that the coupling cannot be readily unscrewed by conventional procedures. Alternatively, the coupling may be frozen or corroded from long standing, again defying efforts to unscrew it.

The sonic wave generating and applying apparatus of the invention is designated generally by numeral 25. It includes a longitudinally split housing 26, formed to surround a length of the pipe containing the coupling, and made up of parts 27 and 28 having mating flanges 27a and 28a connected by screws 29, whereby it may be assembled about the pipe. The two end portions of housing 26 are tubular, as shown, and dimensioned to fit snugly about the pipe. They are packed to the pipe as by means of internal grooves 30 and O-ring seals 31.

Housing part 27 includes a neck portion 32 flange-connected at 33 to one end of a sleeve fitting 34 which, at its opposite end, has an internal annulus 35 welded to the outside of one end portion of a cylindrical housing 36. The chamber 38 inside housing 26 and fitting 34 is filled with a suitable liquid 39, preferably oil, through a filler opening 40, closed by plug 41. A second opening 42, closed by plug 43, permits escape of air while being filled with the liquid.

The housing 36 has a bore 45 extending inwardly from its end remote from the pipe and terminating at a shoulder 46, adjacent the end of the fitting 34, and fitted in said bore is a liner sleeve 47. A vibration generator 48 is slidably fitted in liner sleeve 47 and comprises a tubular housing 50 having an integral upper end wall 51 and a threaded bottom closure wall 52. The vibration generator housing contains a plurality of vertically spaced unbalanced or eccentrically weighted rotors 53 rotatably mounted on fixed transverse shafts 54 set into housing 50. The rotors 53 are mounted on shafts 54 by means of suitable bearings such as indicated at 55, and are provided about their peripheries with intermeshing spur gears 56, as shown. The spur gear 56 for the uppermost rotor 53 is driven from a pinion 57 on tranverse shaft 58 rotatably mounted in the walls of housing 50, and this shaft 58 also carries a bevel pinion 59 driven from bevel gear 60 on the lower end of a shaft 61 journalled in suitable bearings carried by the upper end portion of housing 50. The shaft 61 has a splined connection at 64 with a hollow drive shaft 65 extending from a suitable variable speed electric drive motor 66. Motor 66 may, for example, be an induction motor driven by power at variable frequency delivered by a generator having as a prime mover a variable speed gas engine. In some instances, an ordinary induction motor will have enough "slip" so that it can be driven by a regular 60-cycle source. The motor shaft is journalled below the motor in suitable bearings carried by a transverse wall 67 abutting the upper end of liner sleeve 45, and above the motor by a bushing mounted in a transverse wall 68, the motor being axially positioned by suitable spacer sleeves as shown. The upper end of housing 36 is closed by a cap 69, and a cable 70 containing the necessary motor leads 70 is led out through this cap, as shown.

The lower end wall of housing 50 carries a downwardly extending plunger rod 72 which is fitted for reciprocation within a bore 73 formed in the lower end portion of housing 36. A coil compression spring 74 is confined in housing 36 between shoulder 46 and the bottom of the vibration generator 48 and yieldingly supports it normally in the position illustrated. The lower end portion of housing 36 is reduced, as indicated at 75, and tightly fitted thereover is the upper end portion of a perforated metal sleeve 77. Sleeve 77 is fitted at its lower end to a closure 78. A heavy elastic sleeve 79, preferably composed of rubber, is fitted over perforated sleeve 77, being fastened at its ends to members 73 and 78, as by clamping bands 80.

The cavity 81 inside sleeve 77 and bore 73, up to the lower end of plunger 72, is filled with a suitable liquid, such as oil. A downward displacement of plunger 72, such as caused by the latter described operation of the vibration generator above, results in displacement of a portion of the liquid body in chamber 81 outwardly through the perforations in sleeve 77, causing the elastic sleeve 79 to bulge. The bulging or expanding sleeve 79 exerts a compression on the liquid 39 filling the chamber 38, and this compressive pulse is transmitted throughout the liquid 39 and to the pipe and coupling collar contained therewithin. In some instances I proportion the mass of the oscillating assembly to the elastic stiffness presented by the liquid body so that the whole resonates near a standard motor speed. The complete operation will be more fully described hereinafter.

Returning to a consideration of the vibration generator 48, the unbalanced rotors 53, which are driven from the elastic motor through the described gear train, are so phased with relation to one another that all of their unbalanced or eccentric weight portions move up and down in synchronism with one another. The result is that the vertical components of force owning to rotating of the unbalanced rotors are in phase and additive, the resultant vertically directed alternating force being transmitted to the generator housing 50 through the mounting shafts 54, causing the housing to oscillate longitudinally. This cyclic force is transmitted from housing 50 to the plunger 72, and thence to the liquid body in chamber 81. In the illustrated embodiment, there are four of the unbalanced rotors 53, and in the gearing arrangement shown, two of these rotors turn in one direction and two turn in the opposite direction. Lateral components of force generated by these rotors are, therefore, balanced out.

In operation, the unbalanced rotors 53 of the vibration generator, driven from drive motor 66, thus generate a vertically directed alternating force, which is applied through the rotor shafts to the generator housing. When the resultant force is in the downward direction, the generator housing moves downward against the supporting influence of spring 74 and its plunger 72, moving against the liquid body in the cavity 81, expands the sleeve 79 as described hereinabove. When the force of the vibration generator is reversed and exerted in the upward direction, the generator housing moves upward, under the influence of the upwardly directed force, together with the force of spring 74. The mass of the vibration generator housing prevents it from being overthrown in the upward direction, but to assure controlled operation between predetermined limits, an additional coil spring 84, placed between wall 67 and the upper end of the generator housing, can be used if desired. On the upstroke of the vibration generator housing, the plunger 72 is elevated, drawing the previously displaced liquid back into cavity 81 and bore 73, so causing contraction of the previously expanded sleeve 79.

Alternating compressions and rarefactions are thus applied to the liquid body 39 in the chamber 38, and these travel as sound waves in the liquid medium throughout the chamber. Corresponding compressions and rarefactions are exerted on the outside of the pipe and pipe coupling sleeve 21. A vibration generator of the type illustrated is capable of very powerful force application, and powerful acoustic waves are thus generated and transmitted through the liquid body 39 in the chamber 38, exerting correspondingly powerful alternating contractive and expansive forces on the pipe and its coupling sleeve. These parts are accordingly set into alternating contractive and dilational vibration. It will be seen that to accomplish the alternating contractive and dilational mode of vibration, the sound waves act on the coupling members normally thereto. In other words, the impressed sound waves have components of vibration in planes transversely of the coupling members. By proper speed regulation of the electric drive motor, and/or adjustment of the generator housing mass, the vibrations so established in the pipe and coupling sleeve may be established at a frequency near or coinciding with the resonant frequencies of one or the other of the pipe and coupling sleeve, thereby accomplishing resonant augmentation of the vibration amplitude. A preferred procedure in accordance with the invention is to regulate the frequency of vibration to approximate peak resonance frequency for the coupling sleeve, thereby causing the sleeve to undergo a greater amplitude of vibration than the pipe, with the result that on each expansion half cycle, the coupling sleeve will tend to separate slightly from the pipe. The fact that the coupling sleeve and pipe have different peak resonant frequencies means also that at any given vibration frequency, the vibrations of the sleeve and pipe will be out-of-phase, such that a desirable relative cyclic movement occurs between the two members, tending to work them apart. During such vibration of the coupling members, an unscrewing torque is applied to the pipe, using any suitable or conventional instrumentality, not shown, for the purpose, this being understood to be applied to the pipe outside the housing 26. Owing to the described overexpansion of the coupling sleeve relative to the pipe, and to the out-of-phase vibrations in these members, as described above, a certain dynamic looseness prevails, permitting unscrewing of the pipe with only light to moderate torque application, materially below torque values capable of deforming or damaging the pipe. In certain instances, the unscrewing torque can be exerted following rather than during the vibration of the coupling. This is particularly possible when the coupling has become frozen or corroded during the long service period, and can be broken free or loosened by application of vibration as described. Under many such conditions, the vibrations can be applied to unfreeze the coupling, and the pipe easily unscrewed thereafter.

With respect to generation of frequencies which resonate the coupling sleeve and/or pipe, several procedures in accordance with the invention are available. First, the resonant frequency of the coupling sleeve may be pre-established by calculation, or laboratory test, and the motor driven at the proper speed to generate that frequency. The same is true for the pipe. Alternatively, the motor may be run through a speed range bracketing in the resonant frequencies of the pipe and coupling, resonating first one and then the other. The occurrence of resonance in either member is readily noticeable to the operator by increased vibration amplitude and noise in and issuing from the entire apparatus.

The invention, in one of its practices, contemplates maintaining vibration at the resonance frequency of the coupling sleeve while applying an unscrewing torque until the pipe unscrews. Or, the frequency may be run up and down throughout the selected frequency range, resonating first the coupling sleeve and then the pipe, until the pipe unscrews. Or the frequency may be run up and down, above and below the resonant frequency of the sleeve alone, until the pipe comes free and unscrews. Finally, in some cases, it may not be necessary to attain resonance. Particularly where the coupling is merely frozen from long standing, nonresonant vibration is sufficient to free the stuck threads sufficiently to permit unscrewing. And especially in this case, the unscrewing torque may be applied following the vibration. In particularly difficult cases, however, e.g., in cases of taper thread couplings which have been set up tight, with certain elastic deformation in the coupled members, it is generally essential to resonate the members, especially the outside member, so as to attain differential cyclic expansions and contractions, both in amplitude and in time phase, and therefore separations and dynamic looseness.

Two types of generated waves may be obtained, depending upon the vibration amplitude of the generator plunger 72. With moderate amplitude, the alternating compressions and rarefactions are substantially sinusoidal and symmetrical in character, and operation is as described in the foregoing. Using a generator giving higher force application, as by using sufficient unbalanced mass on each rotor, or a sufficient number of rotors, and a sufficiently powerful drive motor, the amplitude of vibration of the plunger becomes sufficient that the plunger separates from the liquid on each upstroke, causing cavitation. On the subsequent downstroke, a shock wave is then generated, having a steep wave front and a high positive peak amplitude, much greater than maximum amplitude on the negative half cycle. The resulting nonlinear or asymmetric pressure wave, characterized by periodic steep-fronted high positive pressure peaks of short-time duration, and a wealth of harmonic frequency content, alternating with negative pressure swings of long-time duration and moderate amplitude, delivers high-pressure compressive acoustic shocks to the coupling which are especially effective to free frozen threads and to facilitate unscrewing.

Reference is next directed to Figs. 2–5, showing a typical application of the invention to the unscrewing of a pipe casing in an oil well at a selected casing coupling deep in the well, above which there may be a large number of similar couplings. A well bore is indicated at 86, and a casing, lining the same, at 87. This casing is made up of lengths or stands 88, threaded at each end, and provided with couplings 89 comprising conventional coupling sleeves 90 threadedly coupled to opposed end portions of the casing stands. A surface casing of larger diameter is indicated at 91, and, as appears in Fig. 2, the casing head has been removed, the casing 87 has been pulled upwardly somewhat (using any suitable tool, not shown), and has been set in wedge slips 94 contained in slip bowl 95 mounted in a conventional rotary table 96, by which arrangements an unscrewing torque can be exerted on the casing 87. It may be assumed that the casing stand 88 below lower most coupling sleeve 90 is cemented in lower down, or otherwise stuck in the well bore, and that it is desired to recover the string of casing above said lowermost coupling sleeve 90, and that it is therefore required that the casing unscrew at the said lowermost coupling sleeve, and not at some higher coupling.

It may, incidentally, be explained that procedures and instruments are now known and available by which the lowest coupling above the stuck section of casing may be located, and its depth ascertained, and it is to be assumed that such determination has been made.

Figures 2, 3:
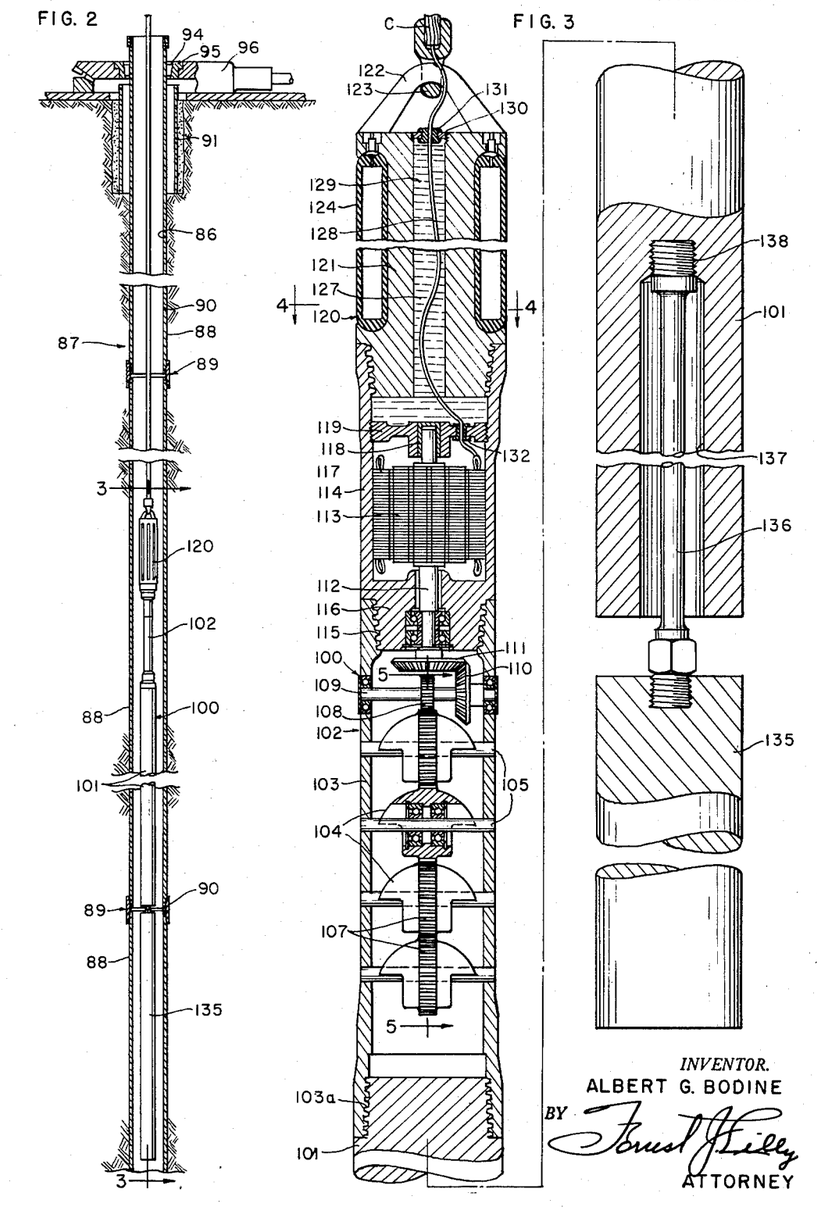
Fig. 2 is a longitudinal sectional view of another form of the invention, designed for unscrewing casing couplings in an oil well.
Fig. 3 is a section taken on line 3—3 of Fig. 2.
Figure 4:
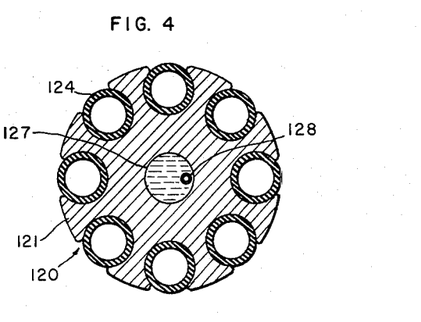
Fig. 4 is a section taken on line 4—4 of Fig. 3.
Figure 5:
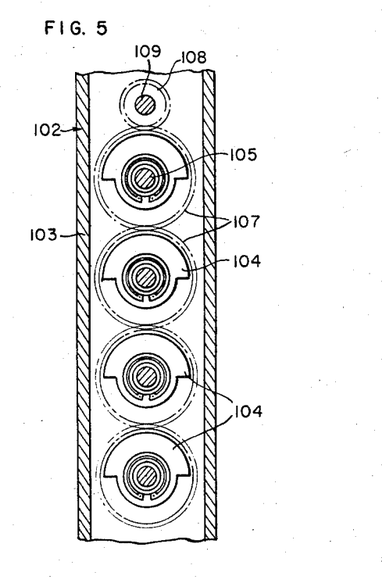
Fig. 5 is a section taken on line 5—5 of Fig. 3.

A sonic wave generating device 100 is then lowered in the casing as by a cable C, and properly positioned relative to the coupling sleeve 90 at which it is desired to unscrew the casing, as represented in Fig. 2. This device 100 includes a long steel shaft 101, and a sonic vibration generator 102 adapted to generate a vertically directed alternating force and apply it to the upper end of the shaft 101. The generator 102 is generally similar to that of the earlier described embodiment of the invention. As here shown, it includes (Figs. 3 and 5) tubular housing 103 threaded, as at 103a, to the upper end of shaft 101. The housing 102 encloses a series of vertically spaced unbalanced rotors 104 rotatably mounted on spaced transverse shafts 105 set into the housing. The rotors include intermeshing gears 107; and the gear 107 for the uppermost rotor is driven from pinion 108 on rotatable shaft 109 carrying bevel pinion 110 driven from bevel gear 111 on shaft 112 of electric driven motor 113. Motor 113, which may again preferably be a variable speed motor, as described in connection with the earlier embodiment, is housed in motor casing 114 threadedly joined to the upper end of vibration generator casing 102 as indicated at 115. Motor shaft 112 is provided at its lower extremity with suitable bearings in lower motor housing end 116, and the upper extremity 117 of the motor shaft is journalled in a bushing 118, closed at its upper end, and tightly mounted in wall 119 threaded into the upper end portion of the motor housing.

The vibration generator rotors 104 are phased as in the earlier embodiment so that vertical components of force owing to their rotation are in phase and additive, while lateral components of force are cancelled. It will be seen that the rotors generate a vertically directed alternating force which is applied to the housing 102 and thence to the upper end of the long elastic shaft 101.

Rotors 104 are driven by electric motor 113 through the described gear train at a speed of rotation, i.e., rotation frequency, equal substantially to the longitudinal resonant frequency of the shaft 101 considered as an elastic free-free bar vibrating in the half wavelength mode. For an 80-foot rod, this frequency is about 100 cycles per second. In this type of rotation, the longitudinal center point of the bar stands nearly stationary, while the upper and lower halves of the bar elastically elongate and contract in step with one another. Thus, the upper and lower ends of shaft 101 undergo equal and opposite vibratory movements in the vertical direction. When the vibrations generated by vibration generator 102 and applied to the upper end of the shaft 101 coincide substantially with the resonant frequency of the shaft 101 for the described half wavelength mode of vibration, a longitudinal standing wave is said to be established in or along the shaft, with a velocity node at the center point of the shaft and velocity antinodes at the two ends thereof. With this resonant standing wave action, maximum acoustic wave amplitude and power can be delivered to the vibratory shaft 101, and subsequently radiated from it. This shaft, vibrating at resonant frequency, is an energy storing device, giving substantial "flywheel" effect to the system.

With the shaft 101 vibrating as described, powerful acoustic waves can be radiated from its lower end into a surrounding body of coupling liquid, generally supplied by the natural well fluids, and efficiently transmitted through such liquid to the surrounding casing coupling.

However, not only does the lower end of the shaft 101 generate acoustic waves, but the upper end thereof, or of the vibration generator coupled thereto, similarly tends to generate sound waves in surrounding liquid in the bore hole, with resulting energy loss in view of the fact that the upper end portion of the shaft and generator are remotely positioned from the coupling to be broken. To prevent sound wave radiation from the upper end, I prefer to mount at the upper end portion of the apparatus an acoustic decoupler unit 120. As shown, the decoupler 120 comprises a generally cylindrical body 121, threaded to the upper end of motor housing 114, and furnished at the top with a bail 122 engaged by eye 123 on the lower end suspension cable C. The periphery of cylindrical body 121 is grooved to accommodate pneumatic cells 124, consisting illustratively of long rubber tubes capable of being pneumatically inflated. These cells are in communication with any surrounding well fluids, as indicated. To be effective, the tubes or cells 124 must be positioned substantially less than one-quarter wavelength of the generated acoustic wave, measured in the surrounding well fluids, from the point of potential sound wave generation, which becomes, in this case, the upper end portion of the body 121. The pneumatic cells will be seen to be located immediately adjacent to the upper end of the decoupler body, and hence are well within the limiting position indicated for the operating frequency of the illustrative apparatus, heretofore given illustratively as in the general region of 100 c.p.s. The pneumatic cells form yieldable bodies which are compressed upon reception of any sound wave pressure pulse in the surrounding liquid. Accordingly, any pressure pulse tending to be created in the well fluids as a result of vibratory action of the upper end of the tool is instantly relieved by contraction of the cells 124, thus cancelling the pulse. Power thus otherwise uselessly expended in generating sound waves in the liquid is thereby conserved.

The described decoupler body 121 is shown to be formed with a central longitudinal bore 127 through which is passed insulated conductor 128 leading downward to a terminal of motor 113 from an electric conductor understood to be housed in suspension cable C. The other terminal of the motor is grounded, and the conductor in cable C will be understood to be connected to a suitable source of electric power at the ground surface. Preferably, the bore 127 and space between the lower end of the decoupler body and the wall 119 are packed with grease, as indicated at 129, to prevent chaffing of the conductor 128. The upper end of the bore 127 is closed by a threaded disk 130 in which is a rubber grommet 131 designed to form a fluid-tight seal with conductor 128, and a similar grommet 132 passes the conductor 128 through wall 119 to the motor.

The apparatus as thus described is fully operative, but a preferred additional feature comprises a device for increasing the output impedance at the point of acoustic wave radiation into the well fluids. This feature is gained by use of a shaft 135 hung below the shaft 101. The shaft 135 may be of the same diameter as the shaft 101, and may be, illustratively about 10 feet in length, so as to process fairly substantial mass. It is shown as suspended from shaft 101 by a relatively slender elastic rod 136 threaded into the upper end of shaft 135, and extending up into a bore 137 in shaft 101 to a point about one-quarter of the length of the shaft 101 from the lower end of the latter, where it is threadedly connected to shaft 101, as indicated at 138. The distance between shafts 101 and 135 is not critical, and may be set in the range of approximately two inches.

Operation of the system of Figs. 2 to 5 will first be considered with the assumption that the shaft 135 is omitted. Assuming the vibration generating device 100 to have been lowered into the well casing, with the lower end of the shaft 101 positioned in the region of the lowermost coupling 89, as indicated in Fig. 1, and further, that the casing is filled with fluid to a level somewhat above the coupling 89 (natural well fluids or by introduced fluids), the motor 113 is driven at a speed to operate vibration generator 102 at a frequency in the region of the resonant frequency for half wave longitudinal elastic vibration of the shaft 101. A resonant standing wave is thereby set up along shaft 101, the two ends thereof vibrating vertically in the region of resonant frequency of shaft 101 through an amplitude which may be of the order of ¼" or ⅜". The upper end of the vibration generator apparatus will not radiate sound waves into the liquid, even if the liquid level is above the upper end portion of the apparatus, because of the acoustic decoupler 120. The lower end of shaft 101, however, radiates a powerful acoustic wave, which is transmitted through the surrounding well fluids to the coupling 89. Impinging on the latter, this powerful acoustic wave exerts alternating compressions and rarefactions on the outside of the casing and coupling sleeve 90. The shaft 101 is designed to have a length dimension such that its resonant frequency, or a harmonic thereof, is in the range of the resonant frequencies of the casing and of the coupling sleeve 90. Because of differences in dimension, as explained in connection with the first described embodiment, the resonant frequency of the casing and of the coupling sleeve 90 differ somewhat from one another. In the preferred practice of the invention, the harmonic resonant frequency of the shaft 101 is matched as closely as possible to the resonant frequency of the coupling sleeve 90, so that, when shaft 101 is vibrating at resonance, the acoustic waves radiated therefrom into the well fluids and applied to the casing and to the coupling sleeve will tend to excite the resonant frequency of the coupling sleeve. Accordingly, alternating contractive and expansive forces are exerted on the casing and the coupling sleeve, preferably at the resonant frequency of the latter. The casing and coupling sleeve are thereby set into alternating contractive and dilational vibration. As explained in connection with the first described embodiment of the invention, the difference in resonant frequencies for the sleeve and casing means that, when the coupling sleeve is vibrated at peak resonance, the amplitude of its described vibration will be greater than that of the casing. Moreover, also because of the different resonant frequencies of the coupling sleeve and casing, the vibrations of the sleeve and casing will be somewhat out-of-phase with one another. Thus, there is created a condition of dynamic looseness, under which the casing string above the coupling may be unscrewed. To accomplish this, an unscrewing torque is exerted in the casing by means of the rotary table, preferably during the vibration of the coupling, although in some cases the torque application will be effective following the vibration treatment. The latter is the case when the vibration treatment succeeds in loosening a frozen or corroded coupling. In most cases, however, torque application is to be maintained simultaneously with vibration of the coupling.

As stated, the preferred practice of the invention comprises operating the vibration generator at a resonant frequency of the shaft 101 and of the coupling sleeve, these resonant frequencies coinciding. This coincidence can be enhanced by having a high fluid level in the well so as to intimately couple the shaft 101 and the casing region by hydraulic pressure. The whole system thus becomes one, and matching is no longer critical. Under these conditions, the sleeve undergoes a greater amplitude of vibration than the casing because it is of greater circumference, and its vibration is somewhat out-of-phase with that of the casing, with the consequence that on each cycle, the coupling sleeve tends to separate slightly from the casing, and assuming a simultaneous application of the unscrewing torque, the coupling unscrews slightly on each cycle of the sleeve and casing.

In the event that the resonant frequency of the shaft 101 is not matched precisely to that of the coupling sleeve, the frequency of the generated vibrations may be run up and down somewhat from the natural resonant frequency of the shaft 101, so as to assure transmission of vibrations to the coupling sleeve at the resonant frequency of the latter when it is desired to resonate the coupling alone. This is, of course, readily accomplished by varying the speed of the drive motor for the vibration generator by suitable equipment at the ground surface, for example, by varying the speed of a gasoline engine serving as a prime mover for a generator furnishing electric power to the motor 113. Operation of the vibration generator somewhat off the precise peak resonant frequency of the shaft 101 means, of course, some degree of lessened power of the radiated acoustic waves. This, however, is of a small degree only and of immaterial consequence in view of the advantages obtained by resonating the coupling sleeve. Further, in some cases, the frequency of operation of the vibration generator may be varied between frequency limits including both the resonant frequency of the coupling sleeve and the resonant frequency of the casing, so that first one and then the other is vibrated at resonance. Also, by operating shaft 101 at large amplitude it will caviate the liquid and thus generate a fairly broad band of frequency. By resonating the casing rather than the coupling sleeve, the contraction half cycles of the casing are of greater amplitude than those of the coupling sleeve, again giving a separating effect. Please difference, owing to the difference in resonance frequency, is helpful in this case also. One further procedure in accordance with the invention is to either operate or design the vibration generating apparatus for vibration at the resonant frequency of the casing rather than of the coupling sleeve, taking advantage, in this case, of the increased amplitude of the contraction half cycles of the casing thereby achieved.

The described dynamic looseness established in the coupling region immediately surrounding the source of the acoustic vibrations assures preferential unscrewing of that particular coupling rather than some other coupling higher up in the casing string. The practice of the invention thus permits unscrewing of the casing at the coupling connecting a frozen section of casing with the entirety of the casing string above, notwithstanding the fact that a large number of additional couplings may be included in the latter.

Considering now the operation of the apparatus in Figs. 2 to 5 with the inclusion of the auxiliary shaft 135 hung below the vibratory shaft 101, the shaft 135 is designed and suspended to stand substantially still in space during the longitudinal vibration of the shaft 135. To accomplish this purpose, shaft 135 is made relatively massive, and hung from shaft 101 by the relatively slender rod 136, which accordingly functions as a spring. In such arrangement, the number 135 is mass reactive, and possesses, with rod 136, a low resonant frequency, such that force pulses transmitted down the rod 136 are incapable of setting shaft 135 into resonant vibration. Rod 136 is attached to shaft 101 well up the latter, where the amplitude of vertical oscillation is slow, and such elastic deformation waves as are transmitted down the rod 136 are almost totally reflected by the massive shaft 135, with the result that shaft 135 stands substantially stationary.

Vertical reciprocation of the lower end of shaft 101 then effects an oscillatory displacement of the liquid between the opposed ends of the two shafts 101 and 135, so that an oscillatory body of liquid is forced radially outward towards the surrounding casing coupling and then inward in turn, so as to alternately develop expansive and then contractive stresses on the casing and the coupling sleeve. The rod 101 is thus in this case directly coupled through a "hydraulic piston" with the casing and coupling sleeve, so as to powerfully alternately expand and contract the casing and coupling sleeve at the frequency of vibration of the apparatus. The device in this case has considerably increased output impedance, and therefore exceptionally good acoustic coupling between the vibration generator and the casing coupling. A vibration generator in the nature of the half wave shaft 101 has a high power input, and with a high impedance output characteristic such as here provided, high alternating expansive and contractive stresses are applied to the coupling. Moreover, the vertical radiation of the emitted sonic energy is greatly reduced and confined to the region of the threaded coupling with the use of auxiliary shaft 135, so that application of expansive and contractive stresses to the casing coupling is highly localized and concentrated.

Figure 6:
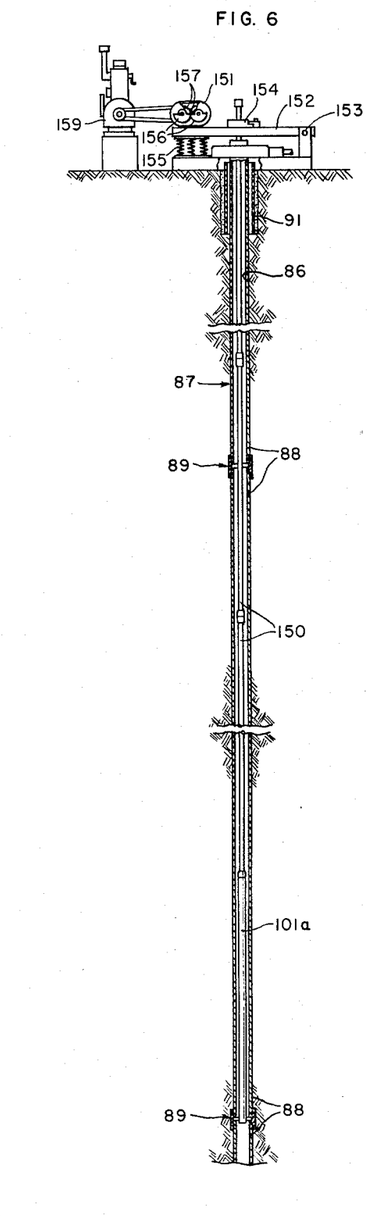
Fig. 6 is a longitudinal section through an alternative form of apparatus for unscrewing a casing coupling in a well bore.

Fig. 6 shows a further modified way of carrying out the invention, using a sonic vibration generator located at the ground surface. In Fig. 6, the well hole, casing, and rotary table are as previously shown and described in connection with Figs. 2–5, and corresponding parts bear like reference numerals. The apparatus in this case includes a vibratory shaft 101a, like the shaft 101 of the immediately preceding embodiment, which, however, is suspended inside the casing string by a string of pipe 150 of lesser cross sectional area than shaft 101a, such as a string of drill pipe, and vibratory energy is transmitted to the shaft 101a down this pipe string 150 from a sonic vibration generator 151 located at the ground surface.

The sonic vibration generator 151 is mounted on the free end of a beam 152, pivotally mounted at its opposite end, as at 153, and having a clamp means 154 tightly engaging the upper end of the pipe string 150. Coil springs 155 yieldingly support the generator carrying end of the beam. The generator 151 comprises, illustratively, two unbalanced weights 156 on parallel shafts which are connected by spur gears 157, one of the shafts being belt-driven from gasoline engine 159. The two weights are arranged so as to move up and down in unison, so that the unbalanced vertical forces which they generate will be additive and will be exerted vertically on beam 152, causing it to oscillate, and to exert a vertical alternating force on the upper end of the casing string. Since the rotors turn in opposite directions, horizontal force components are cancelled.

The vertically directed alternating force exerted on the upper end of the pipe string 150 sends alternating elastic deformation waves of compression and tension down said string to the shaft 101a, the upper end of which is acted on by an alternating force as a result of this wave action. The speed of operation of the oscillator is adjusted to correspond to the resonant frequency of the shaft 101a for half wave vibration, and the shaft is accordingly set into the same type of resonant half wave longitudinal vibration as described in connection with the embodiment of Figs. 2–5. As in the earlier embodiment, the shaft 101a is physically dimensioned to have its resonant frequency in the range of the resonant frequencies of the casing and casing coupling sleeve, especially when considered as a combined system where the acoustic reactance of the casing forms part of the total resonant circuit, all in the manner fully discussed in connection with the preceding embodiment.

Acoustic waves of relatively high amplitude are thus radiated from the lower end of the shaft 101a to the coupling, which is loosened and unscrewed in the manner earlier set forth.

It may further be mentioned that, if desired, or if a higher output impedance should be required, a device such as the shaft 135 of the preceding embodiment may be employed on the shaft 101a. Also, a decoupler such as described in connection with the preceding embodiment may be used at the upper end of the shaft 101a, if necessary.

Figure 7:
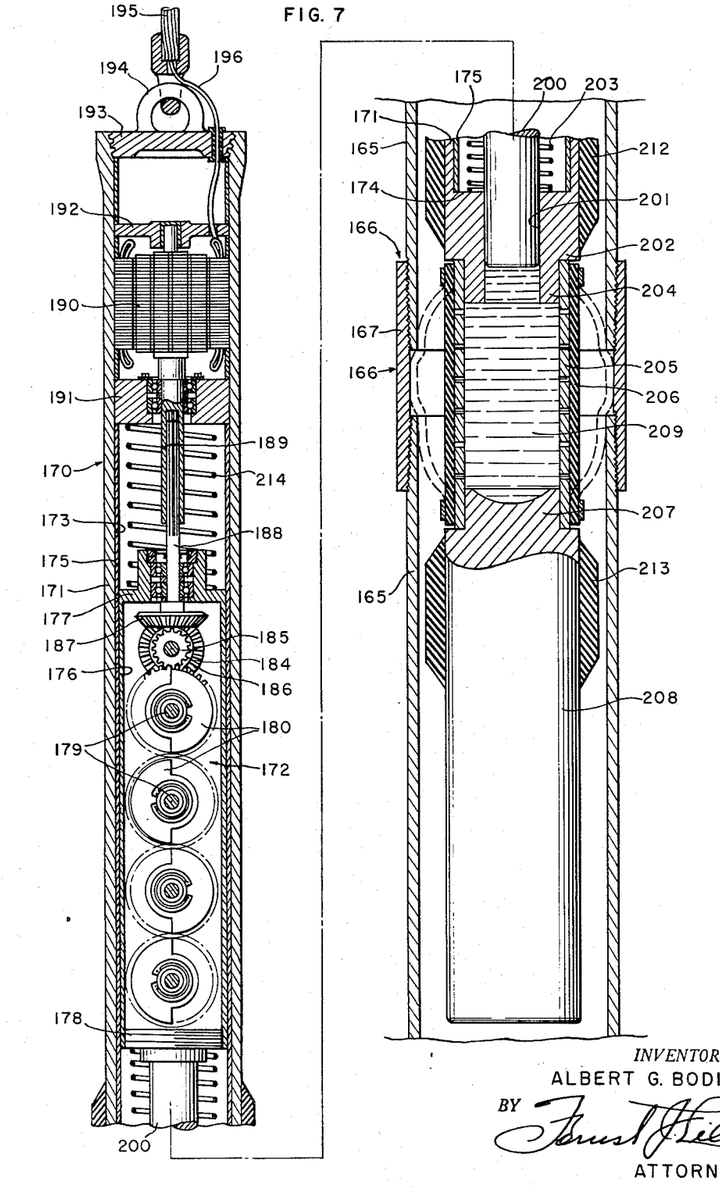
Fig. 7 is a view similar to Fig. 3, but showing an alternative form of apparatus.

Fig. 7 shows another embodiment of the invention, differing essentially from that of Figs. 2–5 in that the half wavelength vibratory bar is in this case eliminated. In this case, a vibration generating device generally of the type shown and described in connection with Fig. 1 is employed. Fig. 7 shows the apparatus as having been lowered into a well casing 165 to a position opposite casing coupling 166, again comprising a coupling sleeve 167 threadedly joining the opposed ends of two adjacent stands of casing.

The sonic vibration generator is designated generally by numeral 170, and comprises tubular housing 171 containing vertically oscillatory vibrator 172 of the unbalanced rotor type, of the same general nature as that described in connection with the embodiment of Fig. 1. Housing 171 has bore 173 extending downwardly from its upper end to a shoulder at 174, and fitted therein is liner sleeve 175. The vibrator 172 comprises tubular housing 176 having an integral upper end wall 177 and a threaded bottom closure plug or wall 178. Mounted in said housing on transverse shafts 179 are unbalanced rotors 180 similar to the rotors of the earlier described embodiments, being geared together by spur gears formed therearound, and the shafts 179 being journalled in the housing in the same way as described in connection with Fig. 1. The rotors are driven through spur gear 184 and a shaft 185, bevel pinion 186 and bevel gear 187 from a vertical shaft 188 journalled in the upper end portion of the vibrator housing and splined to a hollow drive shaft 189 extending downwardly from variable speed electric drive motor 190. The motor shaft is journalled below the motor in transverse wall 191, and above the motor in a bushing mounted in transverse wall 192. The upper end of the exterior housing 171 is closed by plug 193, furnished with bail 194 suspended from lowering cable 195 containing conductor 196 leading to motor 190.

The wall 178 at the bottom of the vibrator case carries a downwardly extending plunger rod 200 which is fitted for reciprocation within a bore 201 formed at the lower end portion 202 of the housing 171. Coil compression spring 203 is confined in the space inside the housing 171 between shoulder 174 and vibrator bottom wall 178, and yieldably supports the vibrator normally in the position illustrated.

The lower end portion of housing 171 is formed with a reduced extremity 204, and fitted tightly thereover is a perforated metal sleeve 205, over which is fitted a heavy elastically expansive sleeve 206, preferably composed of heavy rubber. The perforated sleeve 205 and expansive sleeve 206 are fitted at their lower ends over the reduced upper end portion 207 of a lower body or shaft 208, as shown. Cavity 209 inside the perforated sleeve 205 is filled with a suitable liquid, preferably oil, and this cavity 209 is in open communication with the bore 201, the liquid body extending upwardly into contact with the lower end of plunger 200. Downward displacement of the vibrator 172 below the position illustrated results in displacement of the liquid body in bore 201 in a downward direction, ahead of the plunger 200, and the liquid in cavity 209 in a radially outward direction, causing the elastic sleeve 206 to bulge. Assuming the presence of liquid in the well casing around the tool, the expanding sleeve 206 delivers a compressive pulse to the well fluid, which is thence transmitted directly to the casing coupling 166. Upon subsequent upward displacement of the vibrator 172, liquid is drawn upwardly behind plunger 200, collapsing the expansive sleeve 209, and therefore radiating a pulse of rarefaction into the surrounding well fluids and thence to the immediately surrounding casing coupling.

Preferably, rubber collars 212 and 213 are placed on the tubular housing 171 and the shaft 208, respectively, immediately above and below the sleeve 206, these collars serving to reduce the annular clearance space between the tool and the casing in the region of the expansive sleeve. The annular clearance space that remains is of small area and consequent high acoustic impedance, so that it does not tend to dissipate up and down the casing bore large amounts of acoustic wave energy radiated into the well fluid.

In operation, the unbalanced rotors 180 of the vibrator, driven from motor 190, generate a vertically directed alternating force as described in connection with the earlier embodiments. When the resultant force is in the downward direction, the vibrator housing moves downwardly against the supporting influence of spring 203 and against the liquid body in the cavity 209, expanding sleeve 206 as described above. When the force of the vibrator is reversed and exerted in the upward direction, the vibratory housing moves upwardly, elevating plunger 200, and drawing the previously displaced liquid back in the cavity 209 and bore 201, so causing contraction of sleeve 206. The weight of the vibrator prevents it from being overthrown in the upward direction, but an additional coil compression spring 214 is preferably placed above the upper end of the vibrator housing to assure controlled oscillation of the vibrator housing between suitable predetermined limits.

The described pulses of compression and rarefaction alternately delivered from elastic sleeve 206 to the surrounding well fluids and thence to the casing coupling are effective to loosen the coupling according to principles thoroughly discussed heretofore, and the balance of the operation will now be self-evident. It may be noted additionally, however, that in the case of Fig. 7, the wave generating apparatus is not equipped with a half wavelength resonating shaft, and there is hence no occasion for matching such a member to the resonant frequency range of the casing and casing coupling sleeve. The apparatus in this form is thus somewhat freer for adjustment of its wave frequency throughout a large frequency range, which may in some cases be somewhat helpful in adjusting operation to the resonant frequency of either the coupling collar, the casing, or both.

In this case the resonant frequency involves the wave generating apparatus as a mass and the casing region as a spring, so that the two reactances give a very discrete frequency.

As with the embodiment of Fig. 1, the apparatus of Fig. 7 may be operated in either of two ways, depending upon the power and amplitude of travel of the plunger 200. Assuming first that the plunger travel is insufficient for the plunger to separate from the liquid body at any time throughout the cycle, the generated wave will be substantially symmetrical. However, with plunger travel sufficiently great to cause separation of the plunger from the liquid body on the upstroke, cavitation occurs, and on the subsequent downstroke, a shock wave is generated having a peak positive amplitude much greater than maximum amplitude on the opposing or negative pressure half cycle, and much greater than the amplitude of the wave generated in the first case. The second mode of operation, consisting of repeated cavitation and shock waves, produces an asymmetric pressure wave form characterized by periodic steep-fronted pressure peaks of short-time duration, alternating with negative pressure swings of long-time duration and moderate amplitude. The consequence of this type wave has already been discussed in connection with the embodiment of Fig. 1, and need not be here repeated.

Figure 7A:
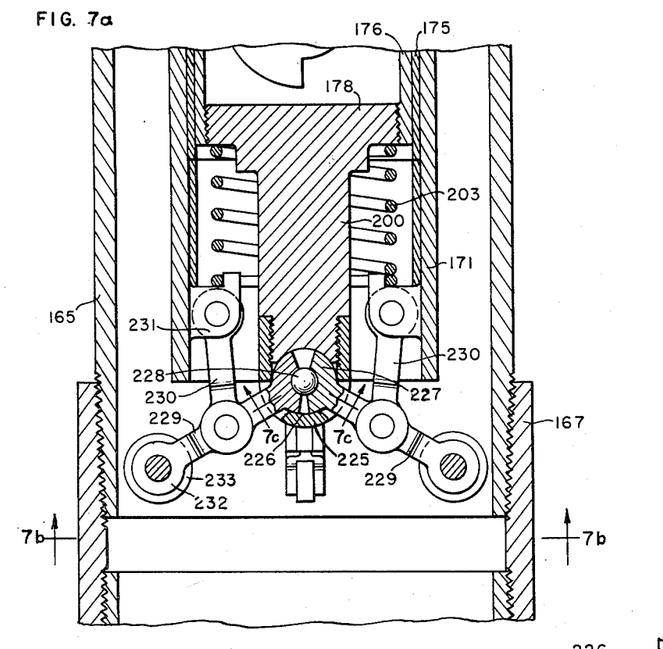
Fig. 7a shows a modification of the apparatus of Fig. 7.
Figures 7B, 7C:
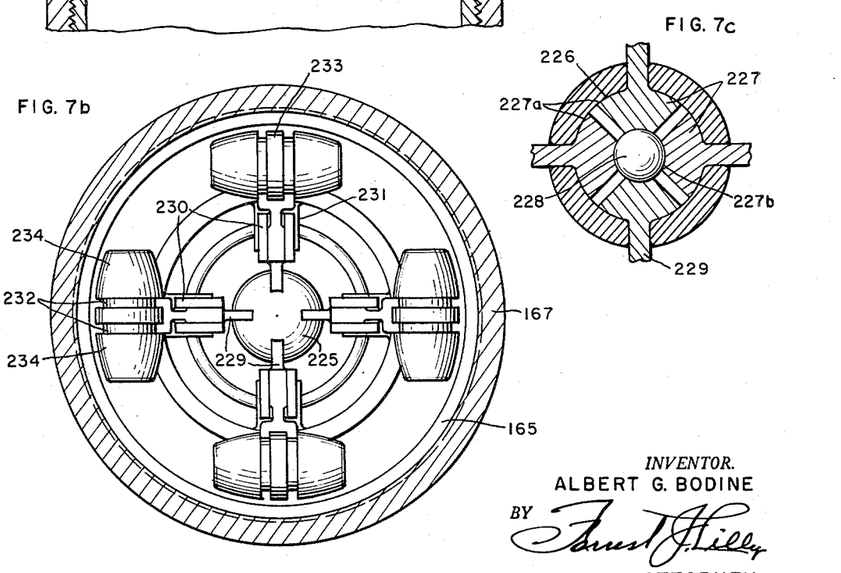

Figs. 7a, 7b and 7c show a modification of the lower end portion of the apparatus of Fig. 7, according to which the wave generator delivers solid-to-solid impacts against the pipe in the coupling region. For convenience, corresponding parts in Figs. 7, 7a and 7b are identified by the same reference numerals.

In the modification of Figs. 7a, 7b and 7c, there is fitted onto the lower end of plunger 200 semispherical housing 225, and the inner surface of this housing and the lower end of plunger 200 are formed to define a spherical cavity 226. Working in this spherical cavity are a plurality of ball segments 227, in this case four in number, having outer spherical surfaces 227a slidably engaging the wall surfaces defining spherical cavity 226, and having inner, concave spherical surfaces 227b which slidably rest on a central steel ball 228. The ball segments 227 are on the inner ends of downwardly inclined toggle arms 229, which enter housing 225 through suitable slots therein, to the midpoints of which are pivotally connected the lower ends of suspension links 230. The upper ends of links 230 are pivotally mounted on lugs 231 formed inside the lower end of exterior housing sleeve 171.

The outer ends of the toggle arms 229 bear rollers adapted for engagement with the inside of the coupled casing 165. In the present embodiment, the outer end of each of the arms 229 is formed with a clevis 232, with one roller 233 rotatably mounted therebetween, and two additional, longer rollers 234 rotatably mounted on but outside the clevis. The set of three rollers is formed with a crowned surface conforming to the curvature of the inside of the casing, as shown.

Fig. 7a shows the parts in a position with the oscillating plunger 203 at the upper end of its stroke. On the downstroke, the inner ends of the toggle arms are depressed and the outer, roller carrying ends of the arms are elevated. Owing to the straightening out of the toggle, the rollers are moved outwardly, and impact with great force on the inside of the casing 165.

These successive impacts on the casing cause it to elastically vibrate. It is of advantage to operate the apparatus at a resonant frequency of the casing and/or coupling sleeve, as with earlier described embodiments of the invention. The operating frequency of the vibration generator may also, or alternatively, be set at a submultiple of the resonant frequency of the casing and/or coupling sleeve.

Different modes of vibration of the casing and coupling may be excited depending upon the number and length of the impact rollers, and the impact frequency. For example, if a large number of rollers are used, e.g. four or more, and especially if the rollers have a long line of contact with the casing, a dilational wave pattern will be achieved, i.e., one involving alternating circumferential expansion and contraction. If the rollers are short, e.g., by removing the two outside rollers from each set of three shown in Figs. 7a and 7b, or are few in number, lateral wave patterns may be generated around the casing. The operation of the invention with this form of solid-to-solid impacting type of wave transmission means from wave generator to casing will be self-evident.

In Figs. 8–15, I have shown another type of apparatus suitable for unscrewing a bound pipe joint in a well bore, illustrating again a coupling in a well casing string. The apparatus of Figs. 8–15 is capable of generation of waves of particularly high power.

Figures 8, 9:
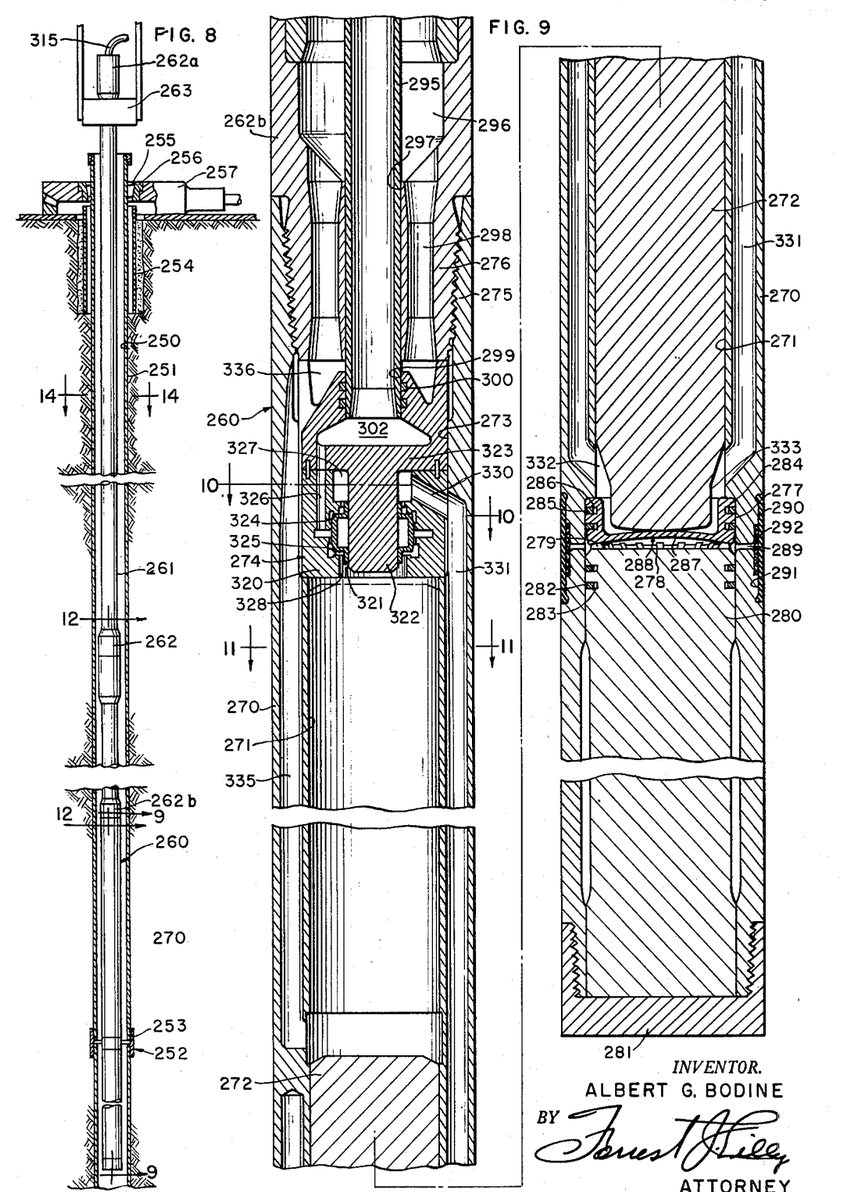
Fig. 8 is a longitudinal section showing a further modified form of apparatus for unscrewing a casing coupling in a well bore.
Fig. 9 is a section taken on line 9—9 of Fig. 8.
Figure 10:
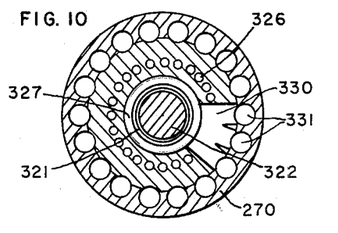
Fig. 10 is a section taken on line 10—10 of Fig. 9.
Figure 11:
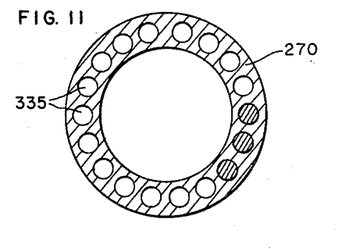
Fig. 11 is a section taken on line 11—11 of Fig. 9.

Referring first to Fig. 8, a well bore is shown at 250, and a well casing at 251, provided with a number of couplings such as 252 (only one shown), each comprising a coupling sleeve 253 threaded to adjacent ends of two stands of casing. A surface casing is shown at 254. The casing head has been removed, and casing 251 has been pulled upwardly somewhat and has been set in wedge slips 255 contained in slip bowl 256 mounted in conventional rotary table 257. The casing may be assumed to be stuck in the well below the illustrated coupling 252, and it is to be assumed that it is desired to unscrew that particular coupling.

A wave generating tool 260 is shown lowered into the casing opposite coupling 252 on pipe string 261, and the latter is furnished at suitable intervals with couplings 262. The pipe string 261 is shown to be suspended above the well from elevator 263 engaging it below the shoulder formed by coupling member 262a.

Figure 12:
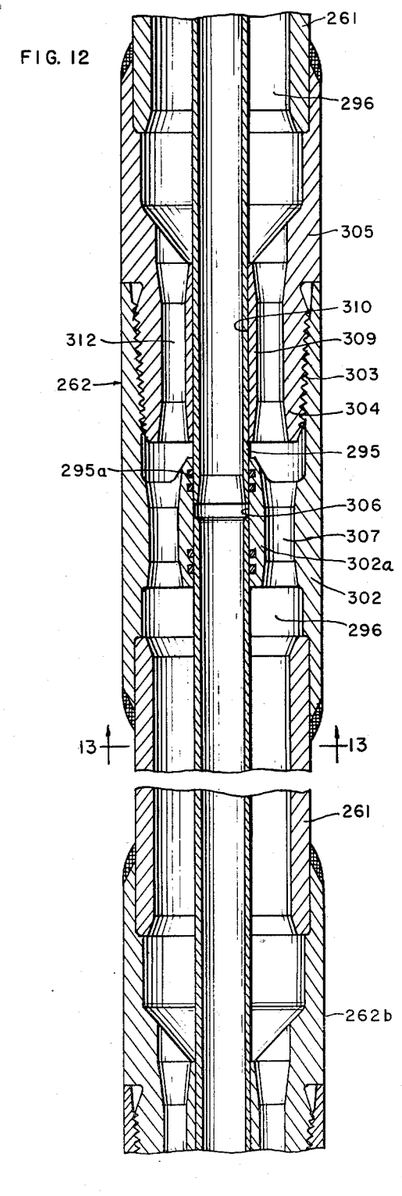
Fig. 12 is a section taken on line 12—12 of Fig. 8.

The tool 260 comprises an elongated cylindrical barrel 270 in which is formed a bore 271 for a free inertia piston 272. Near the top, the bore 271 meets an enlarged bore 273, and seated on the shoulder at the juncture of these bores, and fitted snugly in the bore 273, is a pneumatic valve 274. Above bore 273, the barrel is formed with a threaded coupling box 275 which receives the threaded coupling pin 276 on the lower end of a coupling member or tool joint 262b, the upper portion of member 262b receiving and being welded to the lower end of pipe string 261 (Figs. 9 and 12).

Piston bore 271 extends downwardly for a distance approximately equal to twice the length of the piston, or somewhat greater, to an enlarged bore 277, at the upper end of which is positioned a steel diaphragm 278. The latter seats on a plurality of lugs 279 formed around the top peripheral area of an anvil or inertia member 280 contained within bore 277. The member 280 is of considerable length, in order to afford substantial inertia against later described impacts, and may rest at its lower end on a heavy cap 281 threaded onto the lower end of barrel 270. A fluid seal is formed around the member 280 near the top, and for this purpose I have indicated sealing members 282 in the nature of piston rings located in piston ring grooves 283.

Diaphragm 278 comprises a peripheral annulus 284 snugly fitted in the upper end of bore 277 and sealed therein as by rings 285 positioned in grooves 286. Integral with this annulus is an upwardly arched elastic diaphragm wall 287. The aforementioned lugs 279 engage the periphery of the annulus portion of the diaphragm, leaving the central area of the diaphragm wall 287 free for downward deflection. This wall 287 is caused to deflect, in the operation of the apparatus, by being struck by the falling piston 272. Such downward deflection, caused by such impact, creates a high pressure pulse in an oil filled chamber 288 formed between the diaphragm wall and the upper end of the member 280. Such pressure pulses are transmitted to the well fluids surrounding the apparatus by means of a plurality of ports 289 extending through the wall of barrel 270, and an expansive rubber sleeve 290 bonded at its end regions within an annular groove 291 formed in the periphery of wall 270. A stainless steel screen 292 may be fitted around the wall 270 within the groove 291 over the ports 289, and it will be understood that the sleeve 290 is bonded to the surfaces of the groove 291 outside the area of this screen.

Piston 272 is operated by pneumatic pressure controlled by valve 274 and conveyed to the latter via a pressure pipe 295 positioned concentrically within pipe 261. The annular space 296 between the outside pipe 261 and the inside pressure pipe 295 returns exhausted air to the ground surface. Because of the use of two concentric pipes, special couplings are necessary at the upper end of the tool 260, as at 262b, at each intermediate coupling 262, and at uppermost coupling member 262a.

Confining attention first to the coupling member 262b between pipe 261 and tool 260 (Figs. 9 and 12), the lower end portion thereof is closed within the coupling pin 276, excepting for a central bore 297 to receive pipe 295, and a plurality of passageways 298 designed to communicate the annular space 296 with certain later described exhaust air passageways formed in tool 260. The lowermost end of pipe 295 is coupled into valve 274 by being inserted into an inlet port 299 provided with packing 300. Pipe 295 thus communicates with an inlet chamber 302 in the upper end portion of valve 274.

Figure 13:
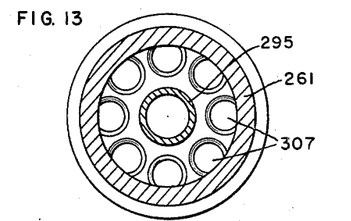
Fig. 13 is a section taken on line 13—13 of Fig. 12.

With reference now to pipe coupling 262, and directing attention to Figs. 12 and 13, the upper end portion of the illustrated section of pipe 261 is fitted into and welded to coupling member 302, which is furnished at the top with taper threaded coupling box 303. Threaded into this coupling box 303 is a coupling pin 304 on the lower end of a mating coupling member 305 fitted over and welded to the lower end portion of the pipe member 261 above. Coupling member 302 has a central hub portion 302a formed with central bore 306 receiving end portions of adjacent lengths of pipe 295 packed as at 295a, and a plurality of surrounding bores 307 communicate with annular air discharge space 296. Coupling member 305 also has a hub portion 309 formed with a central bore 310 to pass pipe 295. Bores 312 around hub 309 pass the upwardly discharging air received from bores 307 and deliver it to the annular space 296 in the pipe length 261 above.

At the top of pipe 261 is the aforementioned fitting 262a, constructed like the coupling member 302 described in the preceding paragraph. Thus, the coupling member 262a has a central bore 306a to receive the upper end of pipe 295, and a plurality of bores 307a therearound to discharge exhaust air from annular space 296 to atmosphere. Inserted in bore 306a, and packed therein, as indicated, is a pipe 315 understood to lead from a source of air under suitable pressure, not shown.

Figure 14:
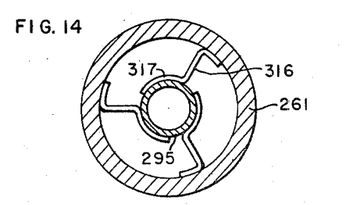
Fig. 14 is a section taken on line 14—14 of Fig. 8.
Figure 15:
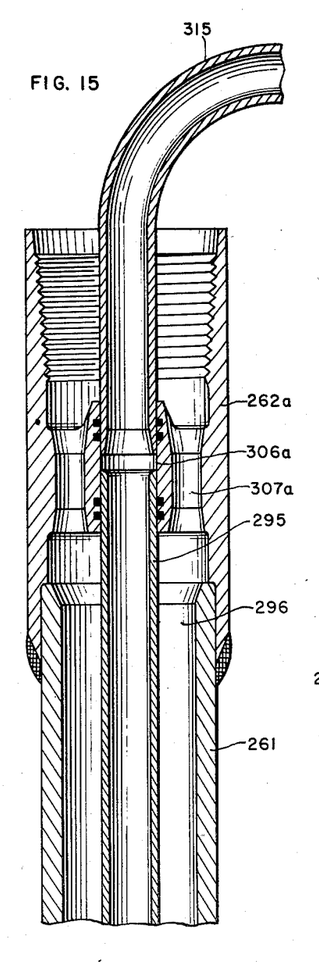
Fig. 15 is a longitudinal sectional view taken through the coupling at the upper end of the pipe string of Fig. 8.

Intervening between couplings 262 are preferredly provided intermediate supports for the pressure pipe 295 within the outside pipe 261, as shown, for example, in Fig. 14. These supports may comprise struts 316 brazed to the inner surface of pipe 261 and formed at their ends with arcuate portions 317 embracing the pipe 295.

Returning now to a further consideration of air valve 274, which is of a conventional type, this valve comprises a valve case 320 having the aforementioned chamber 302 in its upper end portion. A slide valve element 321 is movable vertically on cylindrical member 322, extending downwardly from a head wall 323 integral with the valve housing, so as to move between opposed valve seats 324 and 325. A plurality of bores 326 extending downwardly from chamber 302 covey air under pressure from chamber 302 to this valve element 321, and air is delivered thence either to an annular chamber 327 above, or an annular space 328 below, depending upon whether valve seat 321 is seated against its seat 324, or its seat 325. Air delivered past seat 325, with the valve element in its uppermost position, is delivered directly to the upper end of the piston bore 271. Air delivered past seat 324 to annular chamber 327 flows thence via a passageway 330 to a plurality of vertical bores 331 formed in the sidewall of barrel 270. These bores 331 communicate at their lower ends with the lower end of piston bore 271, discharging into an annular space 332 formed by reducing the lower end portion of piston 272, as indicated at 333.

A plurality of bores 335 formed in the sidewalls of barrel 270 communicate at their lower ends with piston bore 271 at positions just above the upper end of piston 272 in the lowermost position of the latter, and communicate at their upper ends with a space 336 in the upper end of barrel 270, which is in turn in communication with the aforementioned exhaust bores 298 extending through coupling pin 276.

Operation of the system is as follows:

Assuming valve element 321 to be in its upper position, seated on valve seat 324, and piston 272 to be in its uppermost position, indicated in dot-dash lines, pressurized air is delivered to the upper end of the piston bore 271 and drives the piston down. At the lowermost end of the piston stroke, the piston strikes diaphragm 278 with a high impacting force, deflecting diaphragm wall 287 downwardly, and thereby creating a high pressure acoustic pulse within the liquid filled chamber 288. This acoustic pulse is communicated via rubber coupling sleeve 290 to the surrounding well fluids, and thence to the casing coupling. It is, of course, understood that the tool 260 is positioned in the well bore with the coupling sleeve 290 positioned opposite the casing coupling sleeve 253, as has been illustrated in Fig. 8.

The downward movement of the piston causes flow of air upwardly through bores 331 into valve chamber 327; and when the pressure in chamber 327 attains a certain predetermined value, valve element 321, which will be seen to be exposed to the differential of pressures in chambers 327 and space 328, is shifted downwardly and seats at 325. Pressure air then flows upwardly past the valve element to chamber 327, and thence via passage 330 and bores 331 to the bottom end of the piston bore. Air previously delivered to the piston chamber above the piston exhausts via passages 335 when the piston reaches its lowermost position. Accordingly, the pressure fluid delivered to the lower end of the piston bore then drives the piston upwardly. As the piston nears the upper end of its stroke, it compresses air within the upper end of the piston bore sufficiently to create a pressure differential across valve element 321 to cause the valve to shift upwardly to the first described position, whence the cycle is repeated.

The device thus delivers a succession of extremely high positive pressure pulses to the surrounding well fluids, and in turn to the casing coupling. The frequency of piston action is readily regulated by regulating the pressure of the driving fluid, as by means of a suitable control valve, and, therefore, the frequency of the pressure pulses delivered to the casing coupling may be matched to the resonant frequency of the casing, or of the casing coupling sleeve, or alternately to one and then the other, all as described in connection with earlier embodiments of the invention. The repeated type of steep-front acoustic wave delivered by this device has a wealth of frequency content, which tends to "tune in" various elements such as collars, etc. It will further be understood that a torque is exerted on the casing through the rotary table, either during or following the vibratory action.

Figure 16:
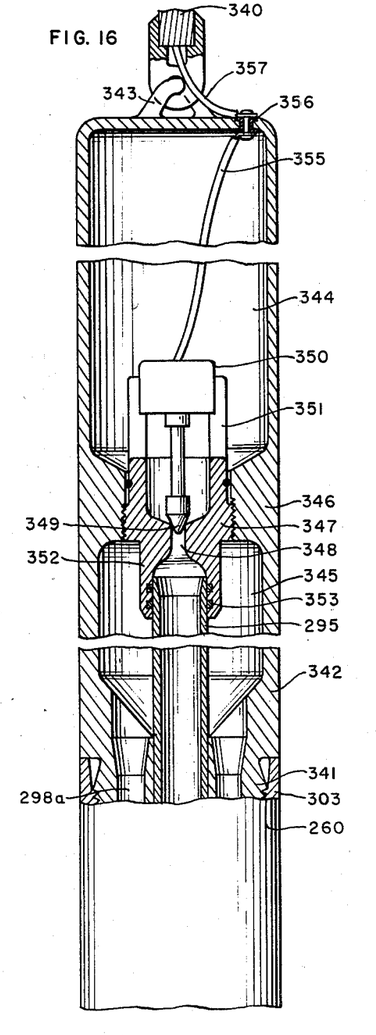
Fig. 16 is a longitudinal sectional view, partly in elevation, showing a modification of the apparatus of Fig. 9.

Fig. 16 shows a modification of the tool of Figs. 8 to 15, according to which the tool is lowered in the well casing on a cable 340, and has a self-contained source of high pressure gas. In Fig. 16, only a fragmentary upper end portion of the tool 260 is shown, and it will be understood that the structure below may be identical with that shown in Figs. 9 to 11. The coupling box 303 at the top of the tool 260 in this case receives a coupling pin 341 at the lower end of a housing 342, the upper end of which is formed with an eye 343 to which the lower end of cable 340 is connected. Housing 342 is divided into an upper high pressure gas chamber 344 and a lower exhaust gas storage chamber 345 by an intermediate wall 346. A valve seat ring 347 is threaded into this wall 346, and is provided with a central port 348 controlled by a valve element 349 operated by a solenoid 350, the latter being mounted on ring 347 by suitable apertured wall structure as indicated at 351. Valve ring 347 includes at the bottom a coupling 352 which receives the upper end portion of pressure pipe 295 leading downwardly to the control valve of the tool 260, packing being employed at 353, as indicated. The exhaust storage chamber 345 will be seen to be in communication with the exhaust air passageways 298a leading up from tool 260.

Solenoid 350 is controlled by a conductor 355 connected to terminal 356, to which is connected conductor 357 led upwardly to the ground surface within suspension cable 340.

Operation of the modification of Fig. 16 will be self-evident. Assuming the tool to have been properly positioned, solenoid 350 is operated to retract valve 349. High pressure gas stored within chamber 344 is then delivered through valve port 348 into pipe 295 leading downwardly to the tool 260; and exhaust gas is received within chamber 345. A sufficient charge of high pressure gas can be stored within the device to assure operation for a time interval necessary to loosen a typical frozen casing coupling.

The invention has now been described and illustrated in connection with a number of illustrative embodiments. It will be understood, of course, that these are for illustrative purposes only, and that various other forms of apparatus for carrying the invention into effect may be adopted without departing from the spirit and scope of the appended claims. It will further be appreciated that while I have herein given two practical applications of the invention, its field of utility is broad and is not to be considered as limited to the two instances here given.

I claim:

1. The method of unscrewing tightly bound cylindrical male and female screw coupling members, each having a different resonant frequency, that comprises: elastically vibrating the coupling members radially in a dilating and contracting mode, at a frequency more nearly matching the resonant frequency of one of the members than the other, whereby the member vibrated at its resonant frequency will tend to separate from the other, and exerting an unscrewing torque on the members.

2. The method of unscrewing tightly bound cylindrical male and female screw coupling members, each having a different resonant frequency, that comprises: elastically vibrating the coupling members radially in a dilating and contracting mode, varying the frequency of the vibrations throughout a range including the resonant frequency of at least one of the two members, whereby the member vibrated at resonant frequency will tend to separate from the other and exerting an unscrewing torque on the members.

3. The method of unscrewing tightly bound cylindrical male and female screw coupling members, each having a different resonant frequency, that includes: locating a body of liquid in contact with said members, generating acoustic waves in said body of liquid for transmission to and into said members, whereby to set said members into radial dilational and contracting elastic vibration, controlling the frequency of said waves to more nearly match the resonant frequency of one of the members than the other, whereby the member vibrated more nearly to its resonant frequency will tend to separate from the other, and exerting an unscrewing torque on said members.

4. The method of unscrewing tightly bound cylindrical male and female screw coupling members, each having a different resonant frequency, that includes: locating a body of liquid in contact with said members, generating acoustic asymmetric shock waves in said body of liquid for transmission to and into said members, whereby to set said members into radial dilational and contracting elastic vibration, controlling the frequency of said waves to more nearly match the resonant frequency of one of the members than the other, whereby the member vibrated more nearly to its resonant frequency will tend to separate from the other, and exerting an unscrewing torque on said members.

References Cited in the file of this patent

UNITED STATES PATENTS

| | | |
|---|---|---|
| 2,086,667 | Fletcher | July 13, 1937 |
| 2,304,793 | Bodine | Dec. 15, 1942 |
| 2,305,261 | Kinley | Dec. 15, 1942 |
| 2,672,322 | Bodine | Mar. 16, 1954 |
| 2,730,176 | Herbold | Jan. 10, 1956 |
| 2,745,345 | Sweetman | May 15, 1956 |